June 4, 1935. W. D. HAILES Re. 19,599

CONTINUOUS TRAIN CONTROL SYSTEM

Original Filed Oct. 22, 1927 2 Sheets-Sheet 1

INVENTOR
W. D. Hailes,
BY
Neil D. Preston,
his ATTORNEY

June 4, 1935. W. D. HAILES Re. 19,599

CONTINUOUS TRAIN CONTROL SYSTEM

Original Filed Oct. 22, 1927 2 Sheets-Sheet 2

INVENTOR
W. D. Hailes,
BY
Neil W. Preston,
his ATTORNEY

Reissued June 4, 1935

Re. 19,599

UNITED STATES PATENT OFFICE 19,599

CONTINUOUS TRAIN CONTROL SYSTEM

William D. Hailes, Brighton, N. Y., assignor to General Railway Signal Company, Rochester, N. Y.

Original No. 1,852,409, dated April 5, 1932, Serial No. 228,058, October 22, 1927. Application for reissue October 19, 1932, Serial No. 638,634

20 Claims. (Cl. 246—63)

This invention relates in general to an automatic train control system, and has more particular reference to a coded continuous alternating current system.

In systems of the general character to which this invention relates, it is desirable to have car-carried decoding or code integrating means which will operate with certainty to control various signal indications and enforce speed restrictions, acknowledgment, etc., and furthermore to have a short interval of time occur between a change in traffic conditions and the change in signal or the like that said change in traffic conditions will cause if the new condition persists. The usefulness of this feature will be found for example when encountering short so called dead sections of trackway as at turnouts, crossovers and the like.

In the system according to this invention, alternating current is automatically coded in accordance with traffic conditions ahead and is then applied to the rails to inductively influence car-carried receiving and amplifying means which control a coding primary relay. The action of the coding primary relay after being decoded or integrated controls secondary relays and circuits. Inserted between the decoding means and the secondary relays and circuits is a delay or suppression means. Said suppression means controls visual cab signals as well as the circuits supplying the secondary relay, etc. This suppression means acts to interpose a time lag or delay of approximately 5 seconds between the operation of the decoding means and the control of the visual cab signals and secondary relays etc. This time lag or delay avoids momentary changes in indications that would otherwise follow momentary changes in trackway conditions.

The decoding means referred to is arranged to operate selectively in accordance with the rate at which the coding primary relay is vibrating between its picked up and released positions, which rate of vibration corresponds to the existing trackway conditions.

The suppression means is also arranged so that, despite the delayed action characteristic of it, there is no possibility of two controls for visual signals or the secondary circuits being set up simultaneously.

Further objects, purposes, and characteristic features of the present invention will appear as the description progresses, reference being had to the accompanying drawings, showing, solely by way of example, and in a wholly schematic manner, one form which the invention can assume. In the drawings:—

Fig. 3 is a diagrammatic representation of codes which can be employed in this invention.

*Trackway apparatus*

Figure 1:
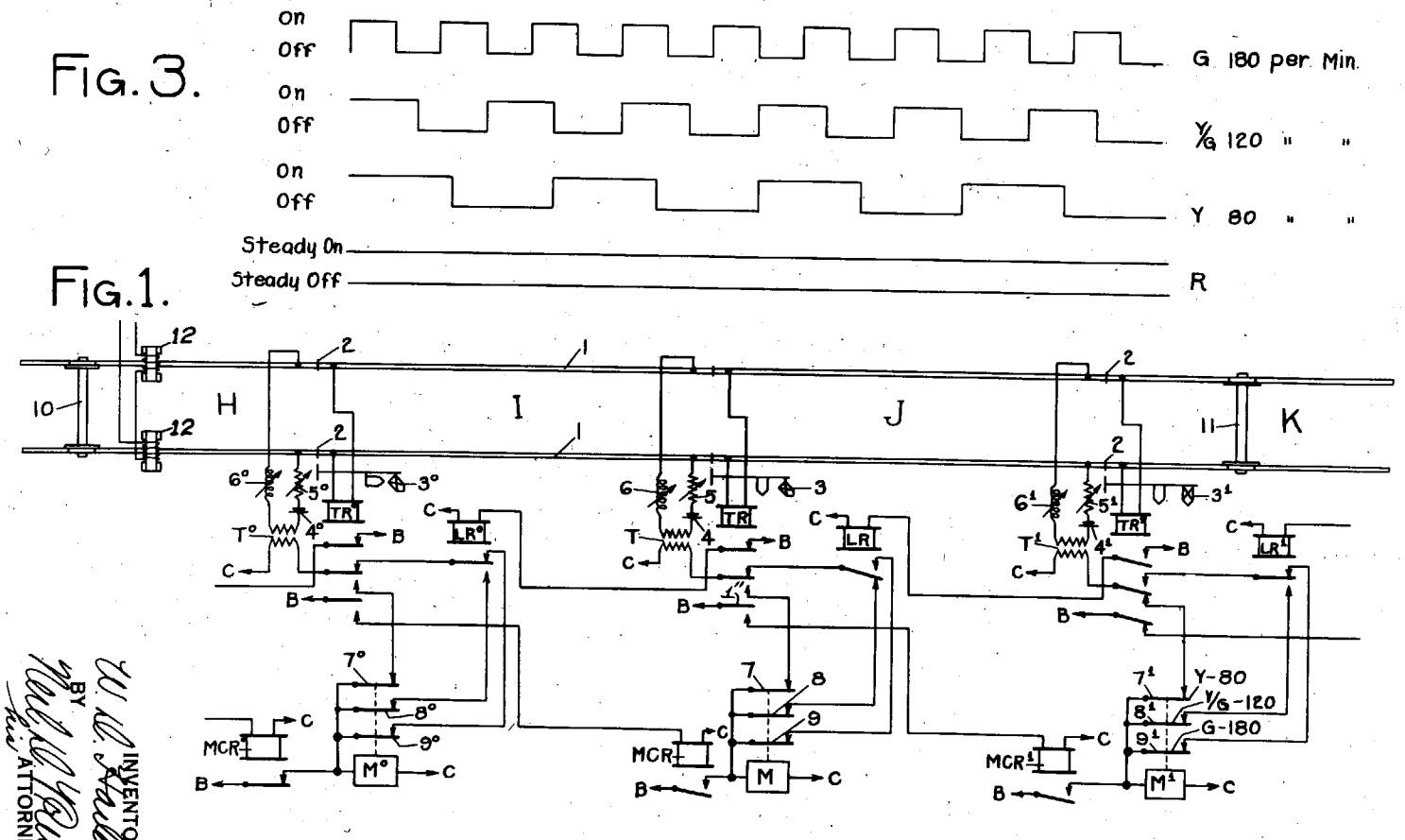
Fig. 1 illustrates, in a diagrammatic manner, trackway apparatus in accordance with this invention.

Referring to the drawings, and first more particularly to Fig. 1 thereof, a stretch of track is shown comprising track rails 1, separated into signalling blocks by means of insulating joints 2, each block being furnished with a wayside signal 3 at its entrance, the various control means for such signals however not being shown, as they are quite unnecessary to a complete understanding of this invention.

In the drawings are shown blocks I and J, and the adjacent ends of blocks H and K, and since the devices and circuits associated with each signal location are identical, corresponding parts for the same are indicated by like reference characters bearing distinctive exponents.

At the exit end of each block is a transformer T, with its secondary connected across the track rails, and in series with a usual track battery 4, and variable resistances and inductive reactances 5 and 6. The energizing circuit for the primary of transformer T is controlled by the track relay TR of the block next in advance, and by the line relay LR controlled by the track relay of the second block in advance. This energizing circuit for the primary of the transformer T passes through one of three coding fingers 7, 8 or 9, operated by a coding motor M, as indicated, the motor being energized through a circuit controlled by a motor control relay MCR, which relay is in turn controlled by the track relay at the entrance to the block fed by such motor.

The coding motors M may assume various forms, and are electrically driven devices which operate to move the various coding fingers 7–9 to put current on and off the track circuit at different rates, finger 7 making and breaking contact at the rate of 80 makes and breaks per minute, finger 8 at the rate of 120 per minute, and finger 9 at the rate of 180 per minute.

The primary of transformer T, is preferably fed with alternating current, and is energized a given number of times per minute, each energized period being separated by a de-energized period of approximately equal duration, as indicated diagrammatically in Fig. 3. The finger 9 for example, makes and breaks contact 180 times per minute, with the result that 180 times per minute the transformer T is energized and is likewise de-energized 180 times per minute. The current preferably is on and off for equal periods, to thus continuously furnish the track rails of any particular block with coded alternating current of a varying characteristic depending upon traffic conditions ahead, the codes shown in Fig. 3 being conveniently designated as fast, medium and slow, and corresponding respectively to 180, 120, and 80 separate impulses per minute.

There has been shown in each of the blocks H and K, a car represented by wheels and axles 10 and 11, thus making, with regard to car 10, the block K a danger block, J a caution block, I an approach caution block, and H a clear block. On considering the drawings, it will be seen that a train entering block K, a danger block, is deprived of all current by the shunting effect of car 11 ahead of it on train control current normally supplied by a transformer $T^2$ (not shown) connected across the exit end of block K. On entering block J, the track relay TR of this block is de-energized to release its contact finger 1'' to pick up relay $MCR^1$ and thus energize coding motor $M^1$, through an obvious circuit, for supplying Y code to the block J through coding finger $7^1$ and transformer $T^1$.

In like manner, on entering block I, J being unoccupied and K occupied, release of track relay $TR^0$, energizes relay MCR to energize coding motor M, through obvious circuits, to thus cause coding fingers 7, 8 and 9 to vibrate, and put Y/G code on block I through coding finger 8 and transformer T.

Car 10, in a clear block H, energizes, in a manner similar to the above, coding motor $M^0$ to put G code on the block through coding finger $9^0$ and transformer $T^0$.

Thus it is seen that each block is arranged to be continuously supplied with coded alternating current of a code depending upon traffic conditions ahead, and that the coding motor is normally at rest, and is energized only upon entrance of a train into its particular block.

It is of course possible that the coding motor might fail to operate, in which event, if the particular coding finger which was connected up to its transformer, stopped in open position, no current would be supplied to the track rails, whereas if it stopped in closed position, an uncoded current would be steadily applied to the rails. As will appear more clearly after a discussion of the car-carried apparatus shown in Fig. 2, a danger signal is displayed by either the absence of any current on the track rails, or by the presence of a steady flow of uncoded current, so that any failure on the part of the coding apparatus can result only in a danger signal, and hence is always on the side of safety.

With regard to the other three signal indications employed in this system, namely, clear, approach caution, and caution, these three indications correspond to the fast, medium, and slow codes respectively, of 180, 120, and 80 separate impulses per minute.

*Car-carried apparatus*

Figure 2:
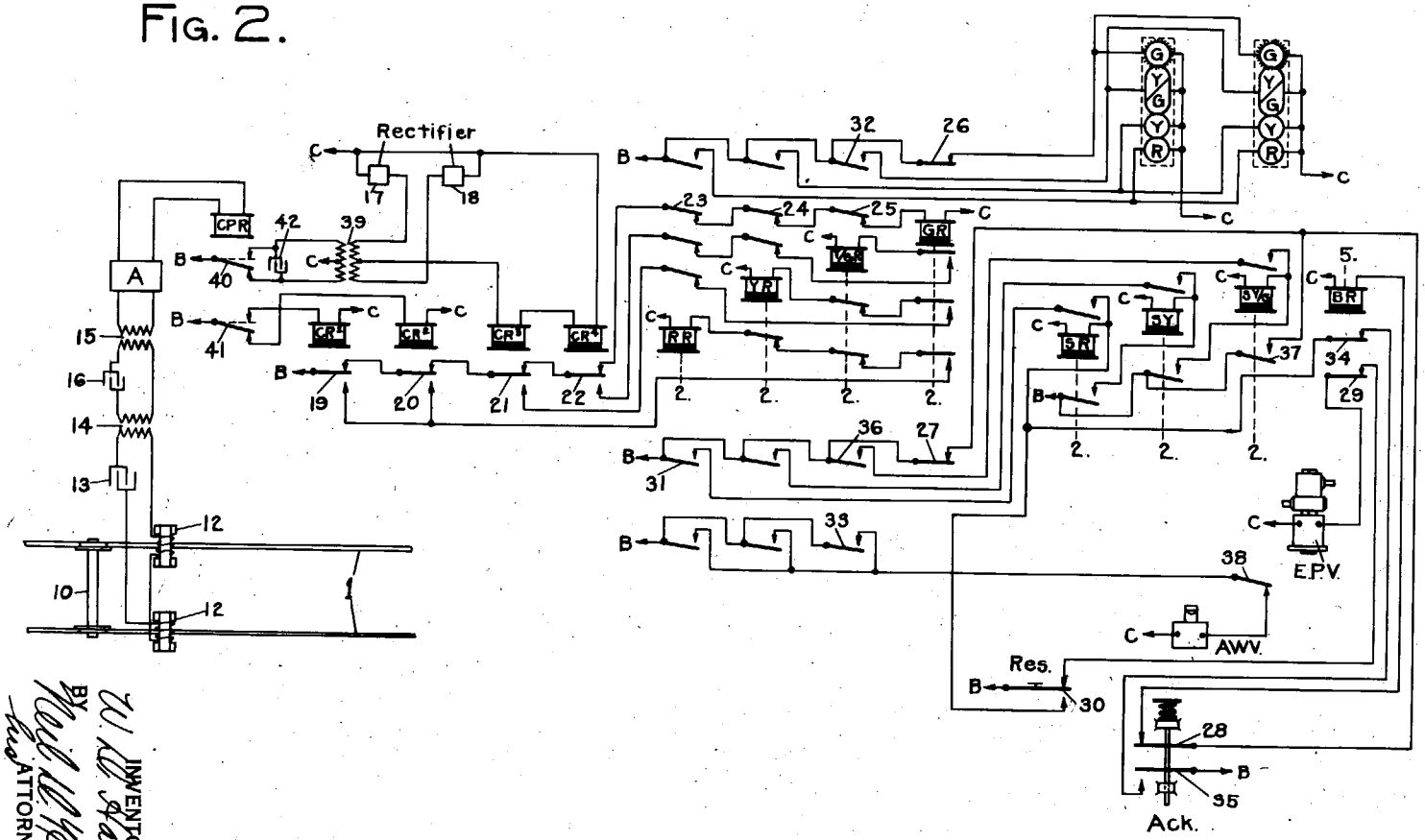
Fig. 2 illustrates, diagrammatically, car-carried apparatus in accordance with this invention.

Referring now to Fig. 2 in which is shown the car-carried apparatus, in accordance with this invention, the car 10, referred to in Fig. 1, is shown as proceeding in clear territory in the same manner as in Fig. 1, and is supplied with inductive receiving coils 12 arranged to pass over the track rails to be inductively influenced by the track current, and connected in series to have the induced voltages of the two coils cumulative. These coils are connected in series with a tuning condenser 13 and the primary of a transformer 14, and the circuit is tuned for the particular frequency of alternating current employed which is preferably different from the usual commercial frequencies, and such, for example, as 100 cycles per second to thus avoid interference by commercial frequency stray currents. The secondary of transformer 14 is connected in series with the primary of a transformer 15 and a condenser 16, constituting a filter circuit F tuned to allow passage only of currents of the chosen frequency. The secondary of transformer 15 is connected to the input side of an amplifier A, which is preferably of the vacuum tube type and is supplied with suitable devices and sources of current, while the output side of the amplifier is connected to a coding primary relay CPR, having contact fingers 40 and 41. The relay CPR, is quick acting and is designed to pick up and drop away for each application to and removal of current from, the rails.

A code integrating or decoding device comprises a group of decoding relays $CR^1$, $CR^2$, $CR^3$ and $CR^4$, and is employed to decode or integrate the particular trackway code received, relays $CR^1$ and $CR^2$ being energized through a front, and a back, contact, respectively, of relay CPR and being designed to have a slow drop away but a quick enough pick up, due to sufficient energy being used, to be picked up by a single impulse of the fastest code employed, with the drop away time so chosen that when once picked, they stay picked up, even with the slow code.

Relays $CR^3$ and $CR^4$ are supplied with pulsating unidirectional current, the average value of which depends upon the rate at which the primary relay CPR is vibrating, increasing when the rate of vibration increases and decreasing when the rate of vibration decreases. To accomplish this result a transformer 39, and a pair of suitable rectifiers 17 and 18 are employed. The secondary of the transformer 39 is provided with a mid tap and the relays $CR^3$ and $CR^4$ are connected in series and to the mid tap with their circuit completed back to the terminals of the secondary of transformer 39 through the rectifiers 17 and 18 according to one usual practice in building a double wave rectifying circuit. This provides a conducting circuit which includes the windings of $CR^3$ and $CR^4$ and one or the other of the return paths to the transformer, according to which instantaneous polarity of driving voltage exists in the secondary windings of the transformer 39.

The primary of the transformer 39 is also provided with a mid tap and to it is connected one terminal C of a local source of D. C. energy. The terminals of the primary are connected, one to the front and one to the back contact of contact finger 40 of the CPR relay. To the heel of said contact finger 40 is connected the other terminal B of the local source of D. C. energy and across the front and back contacts of this finger is bridged a condenser 42 so placed as to reduce the arcing at the contacts as and when the circuits are interrupted by the vibrating of finger 40.

The transformer 39, thus connected, acts as a storehouse of energy, receiving energy from the local source of D. C. energy and passing it on to the relays $CR^3$ and $CR^4$. Energy is not steadily passed on to relays $CR^3$ and $CR^4$ but is passed on in impulses, the number of such impulses in a given time depending upon the rate at which the relay CPR is vibrating its contacts, which in turn is dependent upon the rate at which the control current in the rails is being interrupted or coded, and this of course depends upon the traffic conditions which exist. It is possible to follow one of these energy impulses from the local D. C. source as follows:—Assume for example that the apparatus is in the position shown in Fig. 2 for which condition we find that a steady D. C. current is flowing from the local D. C. source through the circuit including contact finger 40 of relay CPR and its back contact, and the lower portion of the primary winding of transformer 39 to the mid tapoof said winding. We further find that the magnetic circuit of transformer 39 is charged with flux of the polarity corresponding to the magnetizing force of the current flowing in the lower portion of the primary winding of transformer 39. As long as the steady state of primary current exists there is no energy being transferred to the relays $CR^3$ and $CR^4$. But the flux existing in the core of transformer 39 represents stored up energy which can be released by opening the primary circuit, as for example by the movement of finger 40 from its back contact. If a circuit is provided, this energy, or at least a major portion of it, when released, is made to manifest itself by a current flowing through windings of relays $CR^3$ and $CR^4$ and one or the other of the rectifiers under the electrical pressure generated in the secondary winding of the transformer 39 as and when the flux in the core of transformer 39 is decaying.

In a similar manner, current will flow through relays $CR^3$ and $CR^4$, and one or the other of the rectifiers under the electrical pressure generated in the secondary winding of transformer 39, as and when the flux in its core is building up under the influence of a primary current caused to flow, for example by the closing of finger 40 and its front contact of relay CPR.

Thus it is clear that for a movement of the contact finger 40 of CPR as described, i. e. from back to front, there result two impulses of current supplied to the windings of relays $CR^3$ and $CR^4$. However, the movement of finger 40 of CPR is so rapid from back to front (and vice versa) that the impulses occur almost simultaneously, and act as if a single impulse of approximately double intensity had been transmitted.

A similar train of events occurs for a movement of contact 40 from front to back. The current impulses flow in the same direction as before through relays $CR^3$ and $CR^4$, but return over the particular rectifier whose direction of conductivity matches the polarity of the electrical pressure being generated in the circuit.

Now all current impulses through relays $CR^3$ and $CR^4$ are made approximately equal but are of a decaying characteristic and give rise to similar flux conditions in the magnetic circuits of relays $CR^3$ and $CR^4$. The average value of these flux conditions will of course depend primarily upon the rate at which the energizing impulses are received, and the rate at which these fluxes are dissipated. The rate of dissipation and also the maximum value to which these relay fluxes rise is fixed by design, for example by use of short circuited copper on the relay cores, and suitable airgap dimensions and the like, for each of the relays $CR^3$ and $CR^4$.

Relay $CR^4$ is therefore designed and adjusted to pick up and hold up its armature when the flux conditions in its magnetic circuit are those caused by the fast rate of impulses received from the transformer 39, corresponding to the rate of vibration of the relay CPR in accordance with the fast rate of coding the control trackway current, namely 180 times per minute. Relay $CR^4$ is also adjusted to release its armature when the flux conditions in its magnetic circuit reduce to the values that are produced by the medium rate of impulses caused by the medium rate of coding of the control current in the track rails i. e. 120 times per minute.

Relay $CR^3$ is designed and adjusted to pick up and hold up its armature on the flux conditions that exist in its magnetic circuit when receiving impulses at the medium rate and also at the fast rate, which correspond to the medium and fast rates respectively of coding of the control current in the track rails. Relay $CR^3$ is also adjusted to release its armature on the flux conditions that exist in its magnetic circuit when impulses are received at the slow rate which corresponds to the slow rate of coding of the control current in the track rails, namely 80 times per minute. Bearing in mind the characteristic of these four decoding relays, it will be seen that all of the relays will be picked up and remain up, when the fast code is being received, that the first three relays will be up, with relay $CR^4$ down, when the medium code is being received, that $CR^1$ and $CR^2$ will be up and $CR^3$ and $CR^4$ down, when the slow code is being received, while with a flow of alternating uncoded rail current $CR^1$ will be up and $CR^2$ will be down and with no flow of rail current, $CR^2$ will be up and $CR^1$ will be down. The significance of these various operated positions of the decoding relays $CR^{1-4}$, will be apparent after a discussion of the other apparatus.

The system in question employs cab signals in duplicate, one set positioned on the engineer's side of the cab, and the other set on the fireman's side, and includes four separate aspects, namely G, Y/G, Y and R which represent, respectively clear, approach restricting, caution, and danger.

Corresponding to each of the signal aspects, is a quick pickup and slow release relay, GR, Y/GR, YR, and RR corresponding respectively to clear, approach restricting, caution, and danger. It will be noted that each one of these relays, which together constitute a so-called suppression or delay action group has its energizing circuit passing through back points of the other three, whereby only one of the four relays can be energized at any one time.

The present invention includes a slow release relay BR, controlling a brake applying or other train movement restricting device, EPV, which is only conventionally shown in the drawings, and is contemplated to be of a character which is normally energized electrically and which when de-energized operates to produce either a brake application or a speed restricting influence of some desired character. In connection with the EPV is an acknowledging whistle valve, AWV, a reset contactor, *Res.* and an acknowledging contactor, *Ack.*

The energizing circuit for the train control device, EPV, passes through a contact finger 30 and front contact of *Res.* and a contact finger 29 and front contact of brake relay BR. The brake relay BR has an energizing circuit which passes through a contact finger 28 and front contact of *Ack.*, and contact finger 27 and front contact of relay GR constituting one relay of the suppression group; and also has a second energizing circuit, made upon timely depression and release of the acknowledging contactor *Ack.*, which includes contact finger 28 and front point of *Ack.*, contact finger 37 and front contact of a slow release stick relay SY/G, which forms one of a group of three stick relays, SR, SY, SY/G, constituting, an acknowledging and reset relay group. Each of these acknowledging relays, and the brake relay, BR, has a quick pick up with the energy used. In this connection it should be noted that a relay designed to be slow to drop away, will have a quick pick up if sufficient energy be applied to its windings to immediately bring the flux density in its core up to the pick up value, and this is the explanation of the operation of the various relays in this invention which are described as having a quick pick up but slow drop away.

The acknowledging and reset devices used in conjunction with the acknowledging whistle valve and the brake device EPV, are arranged so that upon a change from one traffic condition to a more restrictive one, the whistle valve gives an audible signal, thereby calling the attention of the engineman to the fact that acknowledgment is necessary, by which acknowledgment is properly performed within a limited period of time, namely the drop away period of relay BR, the whistle valve is silenced and de-energization of EPV is prevented, with the resultant forestalling of a brake application or the like. On the other hand, if the acknowledging act is not properly performed a brake application results and the only way to relieve the train from the brakes is to operate the reset contactor *Res*, which is positioned to be accessible only when the train is at standstill, as, for example, by placing it to be accessible only from the ground.

*Operation*

In order to facilitate a complete understanding of this invention the operation of the same will be taken up in some detail in the following.

All of the various parts are shown in the positions and conditions which exist in clear territory, which is the case with the car represented diagrammatically in Figs. 1 and 2 by the wheels and axles 10.

As shown in the drawings, the block H in which is the car 10, is being supplied with the fast code, that is, 180 separate impulses per minute, and this code is being received inductively through the car-carried coils 12 and after passing through the filter circuit and amplifier, energizes the coding primary relay CPR to cause it to pick up and drop away at the rate of 180 times per minute. This causes a supply of energy impulses to the decoding relays $CR^{1-4}$ which as explained above results in all four of these relays being picked up and held up. This in turn causes energization of the suppression group relay GR, through a circuit starting from one terminal B of a source of energy, contact fingers and front contacts 19, 20, 21 and 22 of the decoding relays, and contact fingers and back contacts 23, 24 and 25 of the remaining suppression group relays. With relay GR picked up, an energizing circuit is completed for the two clear signals G through a circuit including a terminal of a source of energy B, contact finger 26 and front contact of relay GR and the clear signal lights G, in multiple, to terminal C. At the same time the pick up of relay GR closes an energizing circuit for brake relays BR which can be traced from one terminal of a source B, contact finger and front contact 27 of relay GR, contact finger 28 and front contact of *Ack.*, relay BR to terminal C. This in turn closes a circuit for the train control device EPV to energize the same, traceable from a terminal C, EPV contact finger 28 and front contact of BR, reset contact finger 30 and front contact, to terminal B. The acknowledging whistle valve AWV, it will be noted, is de-energized, since its energizing circuit requires that one of the suppression group relays RR, YR or Y/GR be energized, and relay SY/G de-energized, and as explained above, with the suppression group relay GR energized, the other relays of such group must necessarily be de-energized.

It will be noted from Fig. 2 that the acknowledging and reset stick relays each have a stick energizing circuit passing through a front contact of the corresponding suppression group relay, as for example, the stick circuit for stick relay SR passes through contact finger 31 and front contact of suppression group relay RR, and likewise for the other relays.

Upon the train in question moving into block I, for example, (see Fig. 1) assuming that the car 11 stays in the block K, the car in question will then be in an approach restricting block and as is apparent from Fig. 1 the medium code will be picked up from the rails and will result in decoding relay $CR^4$ being down and relays $CR^{1-3}$ up, in which circumstances the suppression group relay Y/GR will be energized and the other three suppression group relays will necessarily be de-energized, in the same manner as described above with regard to the energization of relay GR. Likewise in the same manner as described above, this will result in de-energization of signals G by a break in their energizing circuit at the contact finger 26, and the energization of the approach caution signals Y/G through a circuit including contact fingers 32 and front contact of suppression group relay Y/GR.

De-energization of relay GR causes de-energization of slow drop away relay BR, the energizing circuit for such relay being broken at contact finger 27 and front contact of relay GR. At the same time with the de-energization of brake relay BR, the acknowledging whistle valve AWV will be energized through a circuit including contact finger 33 and front contact of relay Y/GR to thus advise the engineer that a brake application is impending unless proper acknowledging action be taken.

If we assume that the engineer is alert and depresses the acknowledging contactor *Ack.*, and then immediately releases it, no brake application will result, since, on depressing the acknowledging contactor, an energizing pick up circuit for stick relay SR is completed which includes contact finger 34 and front contact of relay BR and contact finger 35 and back contact of *Ack.* It will be noted in this connection that each of the three stick relays has a pick up circuit running through a front contact of the stick relay corresponding to the next more restrictive traffic condition and that, being slow to drop, when one of the stick relays is picked up, all those corresponding to less restrictive traffic conditions will likewise pick up. In the case in point, upon pick up of stick relay SR, due to acknowledgment, the pick up circuit for stick relay SY is completed, and it picks up before stick relay SR drops away, even though in the meantime the pick up circuit for relay SR has been broken by releasing the acknowledging contact or *Ack.* In a like manner, pick up of stick relay SY completes a pick up circuit for stick relay SY/G. The particular one of these stick relays which corresponds with the suppression group relay which is energized, in the present case stick relay SY/G corresponding with suppression group relay Y/GR, is stuck up through a stick circuit including one of its front contacts and a contact finger and front contact of the corresponding suppression group relay. With the stick relay SY/G picked up and stuck up, an auxiliary energizing circuit for brake relay BR is completed which includes contact finger 37 and front contact of such stick relay, whereby the brake control relay BR is re-energized before its contact finger 29 has had time to drop away, to thus prevent de-energization of the train control device EPV.

The acknowledging whistle, as described above was sounded upon energization of suppression group relay Y/GR and continued to sound until the energizing circuit was broken upon picking up of stick relay SY/G, at contact finger 38 and back contact of such relay.

It will be seen from the above that upon going from a given traffic condition to a more restrictive condition an automatic brake application will result unless the engineman properly acknowledges when entering the restricted territory.

If acknowledgment is properly performed when the visual cab signal displays the more restrictive indication, the automatic brake application will be avoided, and the acknowledging whistle AWV which sounds a warning upon entering a restricted territory will be silenced and thus inform the engineman that acknowledgment is completed and the apparatus has been put in condition for proper handling of the train under the restrictive conditions encountered.

Assume however that the engineman fails to note the change in cab signal indication and neglects the acknowledging whistle warning, and fails to perform the acknowledging act. In these circumstances, a short time after de-energization of brake relay BR, in the present case about 5 seconds, its contact finger 29 will drop away to thus de-energize the train control device EPV and cause an automatic brake application. After drop away of relay BR the engineman is helpless to bring about a condition permitting him to release the brakes, by operation of the acknowledging contactor *Ack.*, since the above described acknowledging circuit is broken at contact finger 34 and front contact of relay BR. It is therefore necessary to have recourse to the reset contactor *Res.* which necessitates bringing the train to a full stop, and meantime the acknowledging whistle valve has been continuously sounding. Upon operation of the reset contactor, *Res.* a pick up circuit is completed for stick relay SR which includes contact finger 30 and back contact of *Res.* and, as explained above, upon picking up one of the stick relays, all the other stick relays corresponding to less restrictive traffic conditions will successively pick up to ultimately pick up stick relay SY/G to thus re-energize and pick up brake control relay BR to in turn re-energize EPV, and thus permit the engineman to release the brakes and continue if traffic conditions will permit. Also, pick up of relay SY/G, breaks the energizing circuit for AWV, to silence the same.

The same operation occurs on entering a caution or a danger block, and in the same manner as described above. On entering a caution block, the low code is picked up by the train apparatus and causes decoding relays $CR^1$ and $CR^2$ to pick up and stay up with relays $CR^3$ and $CR^4$ both down, to thus energize the caution signals Y.

On entering a danger block there is normally no current on the track rails which can be inductively picked up by the car, under which conditions decoding relay $CR^2$ is up and the other three decoding relays are down, to thus put energy on relay RR of the suppression group and energize the danger signals R.

As referred to above, should the coding motor fail to operate, depending upon in just what position the coding contacts happened to stop, there would either be no current picked up by the car-carried apparatus, or there would be an uninterrupted, that is, an uncoded, current picked up. The first condition has already been taken care of in considering operation in a danger block, while the second condition, an uninterrupted or uncoded current, would result in decoding relay $CR^1$ being up and the other three down, which would again operate to energize relay RR and the danger signals R.

Thus the system is thoroughly protected, as any failures are on the side of safety, any failure of the system resulting in a danger signal being displayed, so that the various apparatus is arranged throughout on the closed circuit principle, as is so desirable in systems of this character.

While in the above discussion, changes in traffic conditions have been assumed to take place at entrances to signalling blocks, with a continuous type of train control such as the present, conditions can change within a block, to become either more or less restrictive, and immediately upon a change to more restrictive condition, such for instance as a clear block changing to an approach caution block, the same operation takes place as described above with regard to passing from the clear block H to the approach caution block I.

Wayside signals 3 have been shown in Fig. 1, but this has been done primarily to aid in a ready understanding of the condition existing in the different blocks shown in the drawings, since it is contemplated that while the present system can be readily used in conjunction with wayside signals, yet it is not at all necessary to employ wayside signals, the cab signals being wholly sufficient in themselves to thoroughly safeguard and facilitate train operation.

The system described above has been considered to employ alternating current, preferably of 100 cycle frequency, for the trackway control current, but it should be noted that direct current can be used to control the car-carried means. This is for the reason that a sudden growth or decay of a D. C. rail current will inductively shock excite the car-carried receiving and amplifying apparatus, and, if sufficient intense this shock excitation will cause oscillations in the above circuits which will persist long enough and have sufficient intensity to momentarily pick up relay CPR.

Thus, by proper arrangement of wayside circuits and apparatus the car-carried apparatus could be controlled by making and breaking a D. C. control current, at such a rate as to reproduce the effect of interrupting or coding an alternating current at a given rate. One method of applying D. C. control current is described as follows:—

From a suitable source of D. C., such as a battery with trickle charge from commercial frequency A. C. energy, a pulsating D. C. current is supplied to the coding motor contacts in lieu of, say 100 cycle alternating current. This pulsating characteristic is obtained, for example, by a suitable automatic vibrator of the type used, for example, on door bells, buzzers, etc.

When the contacts of the coding motor are set in operation, the pulsating D. C. is applied to the rails in the same manner as described for the 100 cycle A. C. current.

Thus, for each closure of a coding motor contact, there is applied to the rails a series of D. C. impulses, occurring in rapid succession, causing nearly continuous shock excitation of the car-carried apparatus. This causes relay CPR to pick up and hold up while the D. C. impulses are continued, and to release when the pulsating D. C. is removed, as for example, by the operation of the coding motor contacts, which contacts in turn are controlled and selected according to traffic conditions.

Further, regarding the use of various forms of control current obtained from local sources of D. C., such as a battery, it is to be noted that the shock excitation employed to excite and thus control the car-carried apparatus is made to produce oscillations in a circuit which is highly selective and excludes the undesired effect of stray alternating currents of frequencies other than the one at which the selective circuit oscillates the most freely. Thus for example the selective car-carried circuit includes, or can include, a filter adjusted to pass a given frequency, as for example 100 cycles and to suppress or alternate the effect of other frequencies, and it is found that this type of circuit can be shock excited as above described.

Also it is to be noted, in adjusting the selective circuit, which is arranged to be inductively energized by control current in the track rails, that it is possible, and also desirable, to adjust for some useful frequency such as 100 cycles. With this adjustment it is then possible to operate the same car-carried apparatus over track circuits that have 100 cycle A. C. control current as well as those having some form of D. C. control current.

The above description of one form of this invention has been given in connection with a wholly diagrammatic showing, the drawings having been arranged to aid in a ready understanding of the invention rather than to show the particular structural forms and arrangements of parts which are actually to be employed in the practical carrying out of this invention. Thus the above description has been given wholly by way of example and is not intended in any manner whatsoever in a limiting sense. Obviously the invention is capable of assuming various physical forms and is susceptible of numerous modifications, and all such forms and modifications are intended to be included by the present application as come within the scope of the appended claims.

Having described my invention, I now claim:—

1. In a continuous train control system, means controlled in accordance with traffic conditions for placing coded current impulses on the track, car carried means responsive to the coded track current and including, decoding means selectively operable in accordance with different rates of current impulses supplied thereto, means distinctively controlled by the coded track current for supplying energy to the decoding means in impulses applied at different rates, a plural aspect signal means having aspects varying in restrictiveness and controlled by the decoding means, and suppression means, comprising a slow release relay corresponding to each signal aspect, and each having an energizing circuit including a back point of each slow release relay corresponding to each more restrictive signal aspect inserted between the decoding and signal means, for delaying action of the decoding means on the signal means.

2. In a continuous train control system, means controlled in accordance with traffic conditions for supplying coded energy, car-carried decoding means variously operable in accordance with the code in force, plural aspect signal means controlled by the decoding means, and suppression means, comprising a slow release relay corresponding to each signal aspect and each having an energizing circuit including a back point of each of the other relays, inserted between the decoding means and said signal means for delaying action of the decoding means on the signal.

3. In a continuous train control system, means controlled in accordance with traffic conditions for placing coded current on the track, car-carried means responsive to the coded track current and including, decoding means selectively operable in accordance with various rates of energy supply thereto, means controlled by the coded track current for supplying energy at different rates to the decoding means, and including, a coding primary relay operable in accordance with the coded track current, a transformer having an intermittent direct current feed to its primary controlled by the primary relay, and a connection, including rectifying means, between the transformer secondary and certain of the decoding means selectively operable according to the rate of energy supplied thereto by the transformer secondary, other of the decoding means being operable regardless of the rate of energy applied to the transformer, and plural aspect signal means controlled by the decoding means.

4. In a continuous train control system, means controlled in accordance with traffic conditions for placing coded current on the track, car-carried means responsive to the coded track current and including, decoding means selectively operable in accordance with coded energy supplied thereto, means controlled by the coded track current for supplying energy to the decoding means, plural aspect signal means controlled by the decoding means, suppression means inserted between the decoding means and said signal means for delaying action of the decoding means on the signal means, a train control device initiated upon deenergization, means causing de-energization of the train control device after the lapse of a predetermined time interval after a change to a more restrictive traffic condition, a readily accessible acknowledging device manually operable to prevent such de-energization of the train control device, a reset device accessible only on standstill of the train and operable to re-energize the train control device, and an acknowledging whistle sounded upon said change in traffic conditions and silenced upon resetting or proper acknowledgement.

5. In a continuous train control system, means controlled in accordance with traffic conditions for placing coded current on the track, car-carried means responsive to the coded track current and including, decoding means selectively operable in accordance with the code in force, means variously controlled by the coded track current for supplying energy to the decoding means, a plural aspect signal having signal aspects of differing restrictiveness controlled by the decoding means, suppression means comprising a slow release relay corresponding to each signal aspect and having an energizing circuit including a back point of each of the other relays, inserted between the decoding means and said signal, for delaying action of the decoding means on the signal, a train control device initiated upon de-energization, a brake relay having a front point included in the energizing circuit for said device, an energizing circuit for the brake relay including a front point of the suppression relay corresponding to the least restrictive signal aspect, and manually operable acknowledging means for shunting out the front point of the least restrictive suppression relay from the energizing circuit of the brake relay.

6. In a continuous train control system, means controlled in accordance with traffic conditions for placing coded current on the track, car-carried means responsive to the coded track current and including, decoding means selectively operable in accordance with the code in force, means distinctively controlled by the coded track current for supplying energy to the decoding means, a plural aspect signal means having signal aspects of differing restrictiveness controlled by the decoding means, suppression means, comprising a slow release relay corresponding to each signal aspect and having an energizing circuit including a back point of each of the other relays, inserted between the decoding means and signal means for delaying action of the decoding means on the signal means, a train control device initiated upon de-energization, a brake relay having a front point included in the energizing circuit for said device, a plurality of acknowledging relays, one corresponding to each signal aspect except the least restrictive, an energizing circuit for the brake relay including a front point of the suppression relay corresponding to the least restrictive signal aspect, and manually operable acknowledging means for shunting out the front point of the least restrictive suppression relay from the energizing circuit of the brake relay.

7. In a continuous train control system, means controlled in accordance with traffic conditions for placing coded current on the track, car-carried means responsive to the coded track current and including, decoding means selectively operable in accordance with the code in force, a plural aspect signal having signal aspects of differing restrictiveness controlled by the decoding means, supression means, comprising a slow release relay corresponding to each signal aspect and having an energizing circuit including a back point of each of the other relays, inserted between the decoding means and said signal, for delaying action of the decoding means on the signal, a train control device initiated upon de-energization, a brake relay having a front point included in the energizing circuit for said device, a plurality of slow release acknowledging relays, one corresponding to each signal aspect except the least restrictive, an energizing circuit for the brake relay including a front point of the suppression relay corresponding to the least restrictive signal aspect, and manually operable acknowledging means for shunting out the front point of the said least restrictive suppression relay from the energizing circuit of the brake relay.

8. In a continuous train control system, means controlled in accordance with traffic conditions for supplying coded energy, car-carried decoding means variously operable in accordance with the code in force, a plural aspect signal having signal aspects of differing restrictiveness controlled by the decoding means, suppression means, comprising a slow release relay corresponding to each signal aspect and having an energizing circuit including a back point of each of the other relays inserted betwen the decoding means and said signal, for delaying action of the decoding means on the signal, a train control device initiated upon de-energization, a brake relay having a front point included in the energizing circuit for said device, a plurality of acknowledging relays, one corresponding to each signal aspect except the least restrictive, an energizing circuit for the brake relay including a front point of the suppression relay corresponding to the least restrictive signal aspect, each acknowledging relay, except the most restrictive. having a pick-up circuit including a front point of the next more restrictive relay and each acknowledging relay having a stick circuit including a front point of the corresponding suppression relay, a second energizing circuit for the brake relay including a front point of the least restrictive acknowledging relay, and acknowledging means operable to close a pick-up circuit for the most restrictive acknowledging relay.

9. In a continuous train control system, means controlled in accordance with traffic conditions for placing coded current on the track, car-carried means responsive to the coded track current and including, decoding means selectively operable in accordance with the code in force plural aspect signal means having signal aspects of differing restrictiveness controlled by the decoding means, suppression means, comprising a slow release relay corresponding to each signal aspect and having an energizing circuit including a back point of each of the other relays, inserted between the decoding means and said signal means for delaying action of the decoding means on the signal means, a train control device initiated upon de-energization, a brake relay having a front point included in the energizing circuit for said device, a slow release acknowledging relay corresponding to each signal aspect except the least restrictive, an energizing circuit for the brake relay including a front point of the suppression relay corresponding to the least restrictive signal aspect, each acknowledging relay except the most restrictive having a pick up circuit including a front point of the next more restrictive relay, each acknowledging relay having a stick circuit including a front point of the corresponding suppression relay, a second energizing circuit for the brake relay including a front point of the least restrictive acknowledging relay, and acknowledging means operable to close a pick up circuit for the most restrictive acknowledging relay.

10. In a continuous train control system, means for supplying coded energy, car-carried means responsive to the coded energy and including decoding means operable in accordance with the code in force, a plural aspect signal having signal aspects of differing restrictiveness controlled by the decoding means, suppression means, comprising a slow release relay corresponding to each signal aspect having an energizing circuit including a back point of each of the other relays, inserted between the decoding means and said signal, for delaying action of the recoding means on the signal, a train control device initiated upon de-energization, a brake relay having a front point included in the energizing circuit for said device, a plurality of slow release acknowledging relays one corresponding to each signal aspect except the least restrictive, an energizing circuit for the brake relay including a front point of the suppression relay corresponding to the least restrictive signal aspect, each acknowledging relay except the most restrictive having a pick up circuit including a front point of the next more restrictive relay and each having a stick circuit including a front point of the corresponding suppression relay, a second energizing circuit for the brake relay including a front point of the least restrictive acknowledging relay, acknowledging means operable to close a pick up circuit for the most restrictive acknowledging relay, and re-set means accessible only when the train is at standstill and operable to complete a pick up circuit for the most restrictive acknowledging relay.

11. In a continuous train control system, means for supplying coded energy, car-carried decoding means selectively operable in accordance with the code in force, a plural aspect signal having signal aspects of differing restrictiveness controlled by the decoding means, suppression means, comprising a slow release relay corresponding to each signal aspect and arranged in cascade, inserted between the decoding means and said signal for delaying action of the decoding means on the signal, a train control device initiated upon de-energization, a brake relay having a front point included in the energizing circuit for said device, a plurality of acknowledging relays, one corresponding to each signal aspect except the least restrictive, an energizing circuit for the brake relay including a front point of the suppression relay corresponding to the least restrictive signal aspect, the acknowledging relays, except the most restrictive, being connected in cascade and each having a stick circuit including a front point of the corresponding suppression relay, a second energizing circuit for the brake relay including a front point of the least restrictive acknowledging relay, acknowledging means operable to close a pick up circuit for the most restrictive acknowledging relay, and an audible signal energized through a back point of the least restrictive acknowledging relay and a front point of any one of the suppression relays except the least restrictive.

12. In a coded continuous train control system, a car-carried coding relay operable to repeat trackway coded current, decoding means including relays respectively energized through a front and a back point of the coding relay and designed to pick up and stay up, for all codes, a transformer, other decoding relays connected in series through rectifying means to the mid-point of the transformer secondary, and a source of direct current applied first to one half and then to the other half, of the transformer primary, through front and back points, respectively, of the coding relay.

13. In a coded continuous train control system, a car-carried coding relay operable to repeat trackway coded current, decoding means including relays respectively energized through a front and a back point of the coding relay and designed to pick up and stay up for all codes, a transformer, other decoding relays designed to pick up on different power inputs thereto and connected in series through rectifying means to the mid-point of the transformer secondary, and a source of direct current applied first to one half and then to the other half, of the transformer primary, through front and back points, respectively, of the coding relay.

14. In a coded continuous train control system, a car-carried coding relay operable to repeat trackway coded current, decoding means including relays respectively energized through a front and a back point of the coding relay and designed to pick up and stay up for all codes, a transformer, other decoding relays connected in series through rectifying means to the mid-point of the transformer secondary, and a source of direct current applied first to one half and then to the other half, of the transformer primary, through front and back points, respectively, of the coding relay, and plural aspect signal means controlled by the various positions assumed by the decoding relays in response to the operation of the coding relay.

15. In a coded continuous train control system, a car-carried coding relay operable to repeat trackway coded current, decoding means including relays respectively energized through a front and a back point of the coding relay and designed to pick up and stay for all codes, a transformer, other decoding relays designed to pick up on different power inputs thereto and connected in series through rectifying means to the mid-point of the transformer secondary, a source of direct current applied first to one half and then to the other half, of the transformer primary, through front and back points, respectively, of the coding relay, and plural aspect signal means controlled by the various positions assumed by the decoding relays in response to the operation of the coding relay.

16. In a continuous train control system, means controlled in accordance with traffic conditions for placing coded current on the track, car-carried means responsive to the coded track current and including, decoding means selectively operable in accordance with the particular code in force, means controlled by the coded track current for supplying energy in distinctive manners to the decoding means and including a coding primary relay operable in accordance with the coded track current and a transformer having an intermittent direct current feed to its primary controlled by the coding relay, certain of the decoding means which is selectively operable in accordance with the particular code in force being connected to the transformer secondary, other of the decoding means being operable regardless of the particular code in force, and means controlled by the decoding means.

17. In a continuous train control system, in combination, means controlled by traffic conditions to place coded current on the track, and car-carried means including a primary relay operable in accordance with the code in force, a transformer having an intermittent direct current feed to its primary controlled by the primary relay and a plurality of decoding relays certain of which are connected to receive energy from the transformer secondary and to operate distinctively in accordance with the particular code in force, other of the decoding relays being connected so as to depend for operation on the primary relay and operating regardless of the particular code in force.

18. In coded continuoue train control systems, a car-carried coding relay operable to repeat trackway coded current, decoding means including relay means having its condition controlled by the coding relay, and designed to be up for all codes, a transformer, other decoding relay means connected through rectifying means to the transformer secondary, and a source of direct current applied first to one portion, and then to another, of the transformer primary, through operation of the coding relay.

19. In a coded continuous train control system, a car-carried coding relay operable to repeat trackway coded current, decoding means including a relay having its energization controlled by the coding relay, and designed to pick up and stay up for all codes, a transformer, other decoding relays connected to the transformer secondary, and a source of direct current applied first to one portion, and then to another, of the transformer primary, through operation of the coding relay.

20. In a coded continuous train control system, car-carried apparatus including, a coding relay operable to repeat trackway coded current, and decoding means including a transformer, a source of direct current applied alternately to different portions of the transformer primary with the application thereof controlled by operation of the coding relay, and a plurality of decoding relays connected to be selectively energized from the transformer secondary in accordance with the operation of the coding relay.

WILLIAM D. HAILES.